(12) United States Patent
Tokuda

(10) Patent No.: US 7,688,484 B2
(45) Date of Patent: Mar. 30, 2010

(54) IMAGE-FORMING DEVICE HAVING BOTH AN IMAGE-READING UNIT AND AN IMAGE-FORMING UNIT BEING MADE COMPACT

(75) Inventor: Hiroshi Tokuda, Nishikamo-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1339 days.

(21) Appl. No.: 11/094,425

(22) Filed: Mar. 31, 2005

(65) Prior Publication Data

US 2005/0219654 A1    Oct. 6, 2005

(30) Foreign Application Priority Data

Mar. 31, 2004    (JP)    .............................. 2004-107702

(51) Int. Cl.
H04N 1/04    (2006.01)
B65H 31/00    (2006.01)
B65H 31/04    (2006.01)

(52) U.S. Cl. ...................... 358/498; 358/474; 358/496; 271/207; 271/213

(58) Field of Classification Search ................. 358/496, 358/474, 498; 271/207, 213
See application file for complete search history.

(56) References Cited

U.S. PATENT DOCUMENTS

| 5,085,422 | A | * | 2/1992 | Sagara | ......................... 271/162 |
| 5,412,490 | A | * | 5/1995 | Kojima et al. | ................ 358/473 |
| 6,113,093 | A | * | 9/2000 | Morinaga et al. | ........... 271/162 |
| 6,510,301 | B2 | | 1/2003 | Tanaka | |
| 2003/0095296 | A1 | * | 5/2003 | Terashima et al. | ........... 358/498 |

FOREIGN PATENT DOCUMENTS

| JP | A-11-160942 | 6/1999 |
| JP | A 2001-036680 | 2/2001 |
| JP | A 2001-156965 | 6/2001 |
| JP | A-2001-242563 | 9/2001 |
| JP | A 2001-285571 | 10/2001 |
| JP | A 2002-328500 | 11/2002 |

* cited by examiner

Primary Examiner—Benny Q Tieu
Assistant Examiner—Ngon Nguyen
(74) Attorney, Agent, or Firm—Oliff & Berridge, PLC

(57) ABSTRACT

An image-reading portion switches between a storage state in which a conveying path extends substantially vertically along a front surface of a main unit and a usage state in which the conveying path extends diagonally downward. In the storage state, the entire device can be made suitably compact, whereas in the usage state, the operability of the image-reading portion is enhanced.

10 Claims, 15 Drawing Sheets

IMAGE-FORMING DEVICE HAVING BOTH AN IMAGE-READING UNIT AND AN IMAGE-FORMING UNIT BEING MADE COMPACT

BACKGROUND OF THE INVENTION

1. Field of the Invention

The present invention relates to an image-forming device that is provided with both of an image-reading unit for reading an image of a document and an image-forming unit for forming an image on a recording medium.

2. Description of Related Art

There have been proposed image-forming devices of a type that accommodates an image-forming unit in a casing thereof and that has an image-reading unit on an outer surface of the casing. The image-reading unit has a conveying path for conveying a document, and reads an image of the document while conveying the document along the conveying path.

In the image-forming device proposed by Japanese unexamined patent application publication No. 2001-285571, the image-reading unit is attached to an upper front surface of the casing with the conveying path being oriented diagonally downward.

SUMMARY OF THE INVENTION

However, because the image-reading unit is attached with the conveying path extending diagonally downward, the entire image-forming device cannot be made sufficiently compact.

An object of the present invention is to provide an image-forming device that is provided with both an image-reading unit and an image-forming unit and that can be made compact without inducing any increase in cost, while ensuring the operability of the image-reading unit.

In order to attain the above and other objects, the present invention provides an image-forming device including: an image-reading unit 61; and a main unit 1. The image-reading unit 61 has a conveying path 63. The image-reading unit 61 further has an image-reading portion 70 that reads an image of a document while the document is being conveyed along the conveying path 63. The main unit 1 has a main casing 2 and an image-forming unit 7. The image-forming unit 7 forms an image on a recording medium and being accommodated in the main casing 2. The main casing 2 has a predetermined surface that extends substantially in either one of a horizontal direction and a vertical direction. The image-reading portion 70 is switched with respect to the main unit 1 between a first state in which the conveying path 63 extends along the predetermined surface and a second state in which the conveying path 63 extends diagonally downward.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

Figure 1:
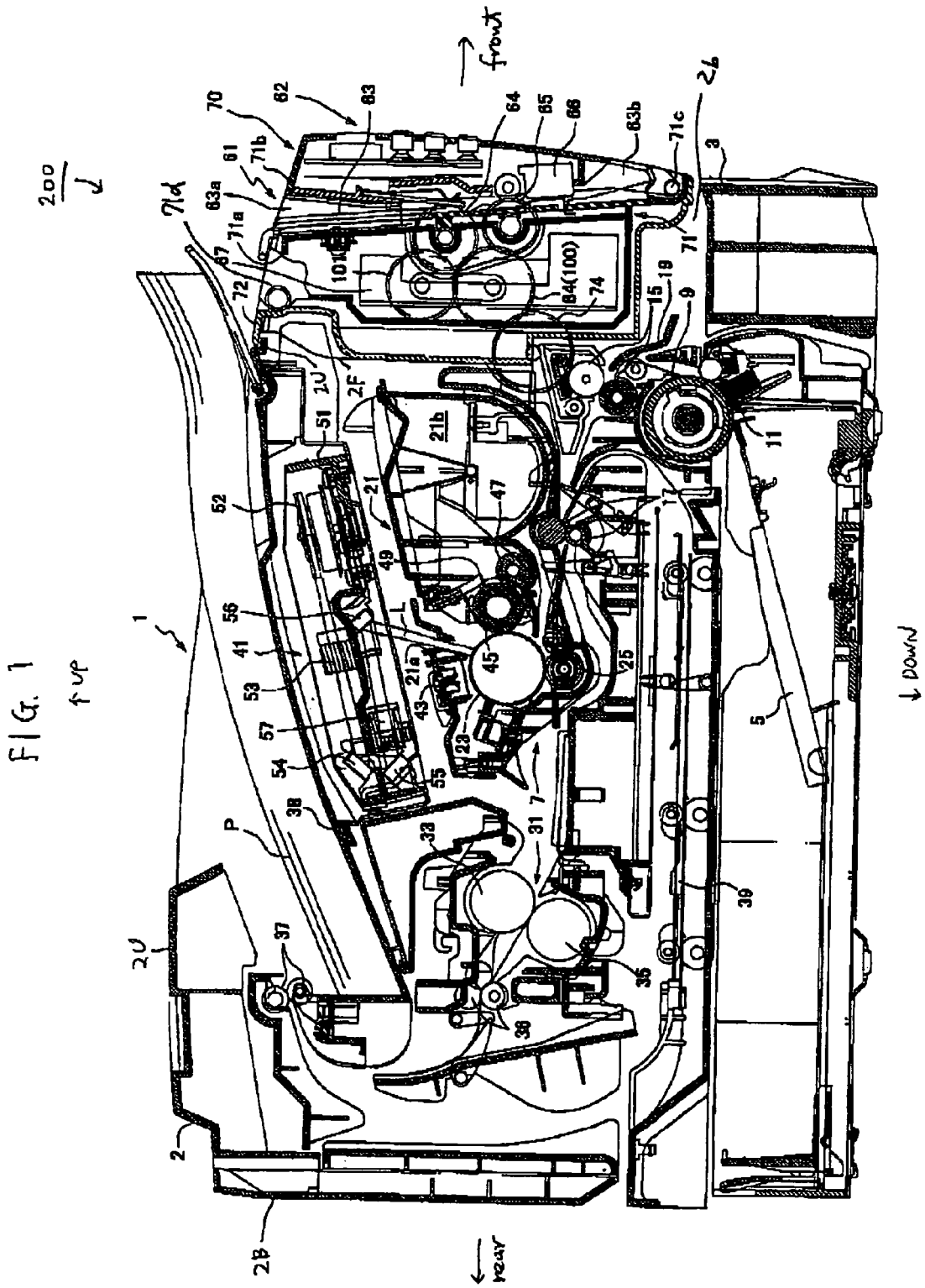
FIG. 1 is a sectional view showing an entire structure of a laser printer according to an embodiment of the present invention, wherein an image-reading portion in a facsimile unit is in a storage state.

An image-forming device according to a preferred embodiment of the present invention will be described while referring to the accompanying drawings wherein like parts and components are designated by the same reference numerals to avoid duplicating description.

In the following description, the expressions "front", "rear", "upper", "lower", "right", and "left" are used to define the various parts when the image-forming device is disposed in an orientation in which it is intended to be used.

Figure 2:
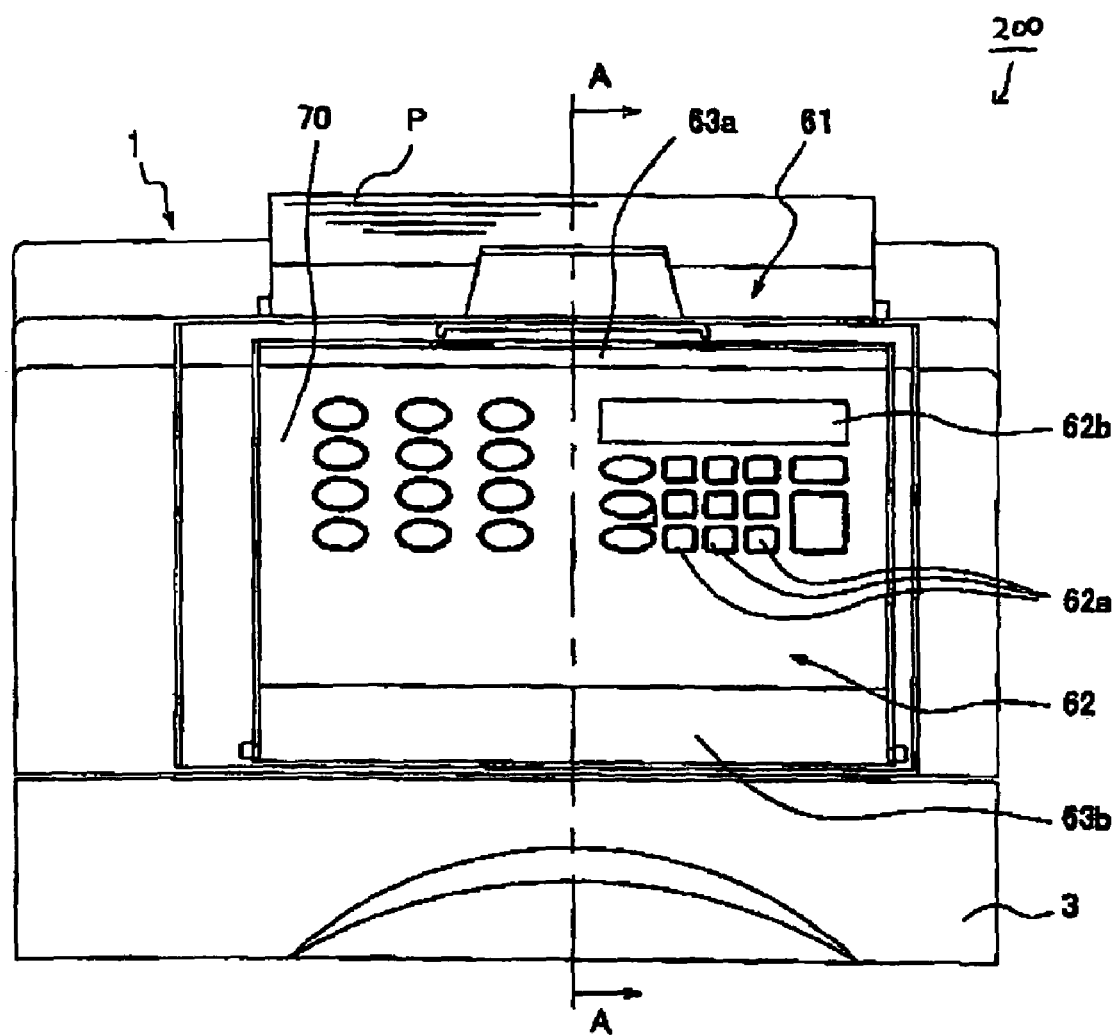
FIG. 2 is a front view of the laser printer of FIG. 1.

FIG. 2 is a front view of a laser printer 200 according to the embodiment. FIG. 1 is a sectional view of the laser printer 200 along a line A-A in FIG. 2.

As shown in FIG. 1, the laser printer 200 includes; a main unit 1 and a facsimile unit 61. A process cartridge 21 is detachably mounted in the main unit 1. The facsimile unit 61 is detachably attached to the front surface of the main unit 1. Instead of the facsimile unit 61, an auxiliary tray 91 (which will be described later with reference to FIG. 7) can be attached to the front surface of the main unit 1.

Figure 3:
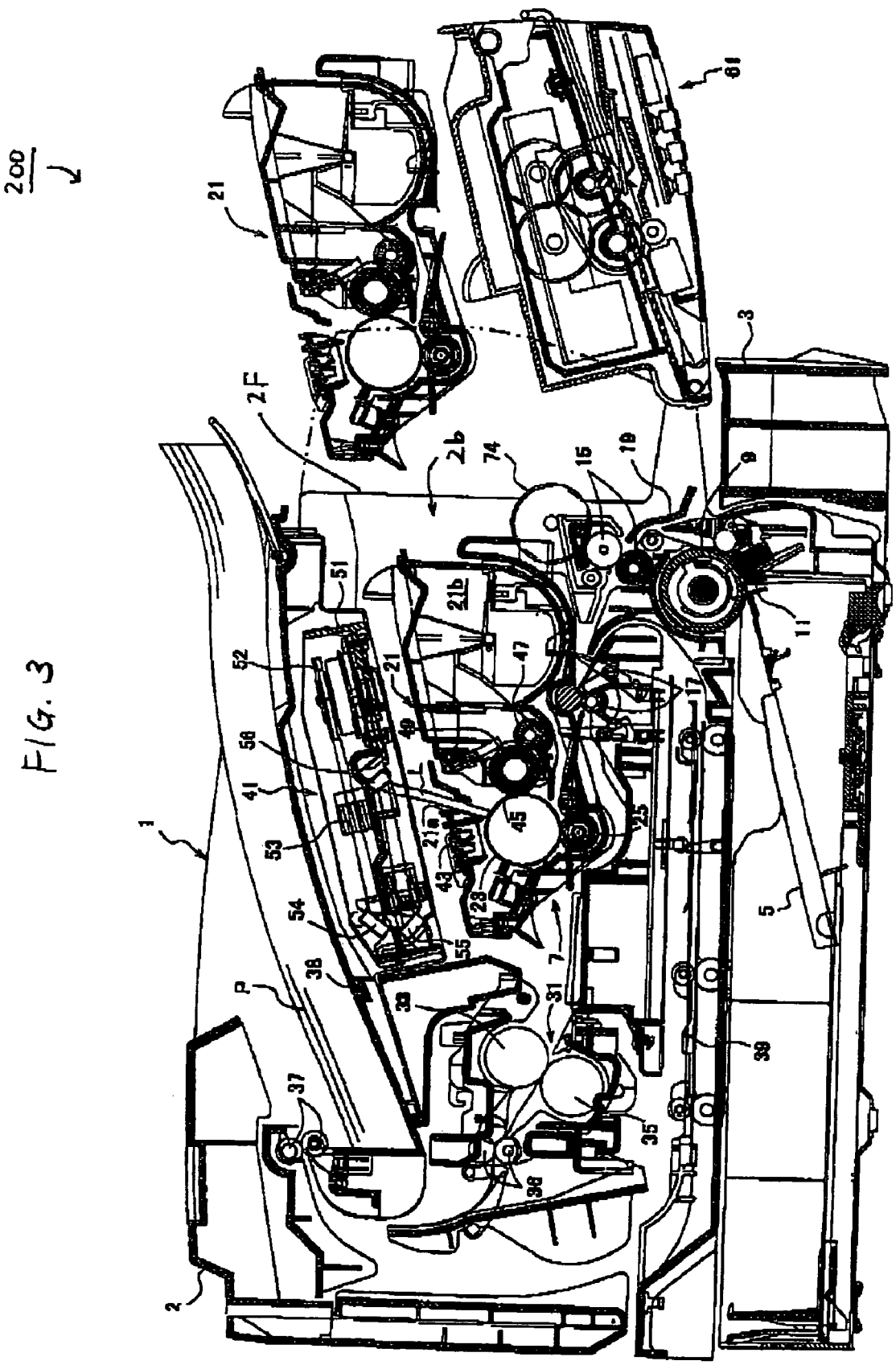
FIG. 3 is a sectional view of the laser printer in a state in which the facsimile unit is in an opened state.
Figure 4:
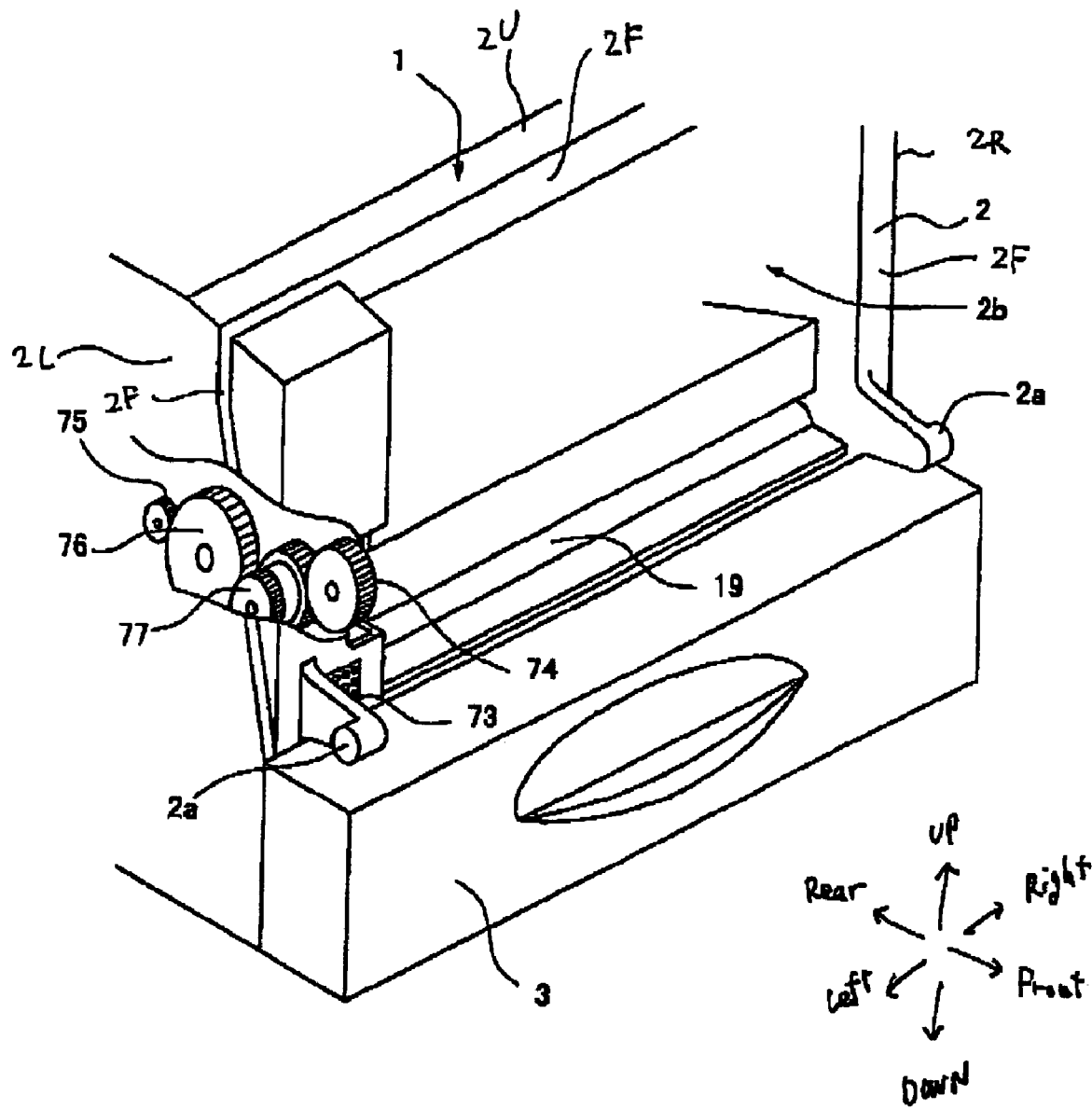
FIG. 4 is a perspective view of a front side of a main unit in the laser printer.

The main unit 1 has a casing 2, which constitutes an outer surface of the main unit 1. As shown in FIG. 4, the casing 2 has an upper wall 2U, a right-side wall 2R and a left-side wall 2L, whose front edges constitute a front side surface 2F of the casing 2. As shown in FIG. 1 and FIG. 3, the front side surface 2F extends substantially vertically. The casing 2 has an aperture portion 2b at its front side as also shown in FIG. 4. The aperture portion 2b is surrounded by the front edges of the walls 2U, 2R, and 2L. The casing 2 also has a rear side surface 2B as shown in FIG. 1. The is rear side surface 2B is opposite to the front side surface 2F.

As also shown in FIG. 4, the main casing 2 has a pair of shafts 2a at the front side thereof. The facsimile unit 61 is detachably attached at its lower edge to the pair of shafts 2a. The facsimile unit 61 is pivotable at its lower edge about the pair of shafts 2a. The facsimile unit 61 can be rotated about the shafts 2a between its closed position where the facsimile unit 61 closes the aperture portion 2b as shown in FIG. 1 and its opened position where the facsimile unit 61 opens the aperture portion 2b as shown in FIG. 3, similarly to the facsimile unit 61, the auxiliary tray 91 is detachably attached to the pair of shafts 2a.

A sheet cassette 3 is detachably mounted in the casing 2 at its lower portion. A support plate 5 is provided in the sheet cassette 3. The support plate 5 is for mounting thereon a stack of recording papers P. The support plate 5 is urged upwardly by a spring (not shown). A feed roller 9 and a separation pad 11 are provided above the support plate 5. The feed roller 9 and the separation pad 11 cooperate to separate one sheet at a time from the stack of the recording papers P on the support plate 5, and feeds the sheet to an image forming portion 7 to be described later.

A sheet conveying path is defined from the feed roller 9 to the image forming portion 7. A pair of conveyance rollers 15 and a pair of registration rollers 17 are provided along the sheet conveying path. The registration rollers 17 are for temporarily stopping feeding the sheet P and for performing registration operation onto the sheet P to correct the orientation of the sheet P, before feeding the sheet P to the image forming portion 7. More specifically, if the sheet P has been conveyed in an oblique fashion with respect to the sheet conveying direction, the registration rollers 17 correct the orientation of the sheet P so that the sheet P will be conveyed with its center line extending parallel with the sheet conveying direction.

Figure 7:
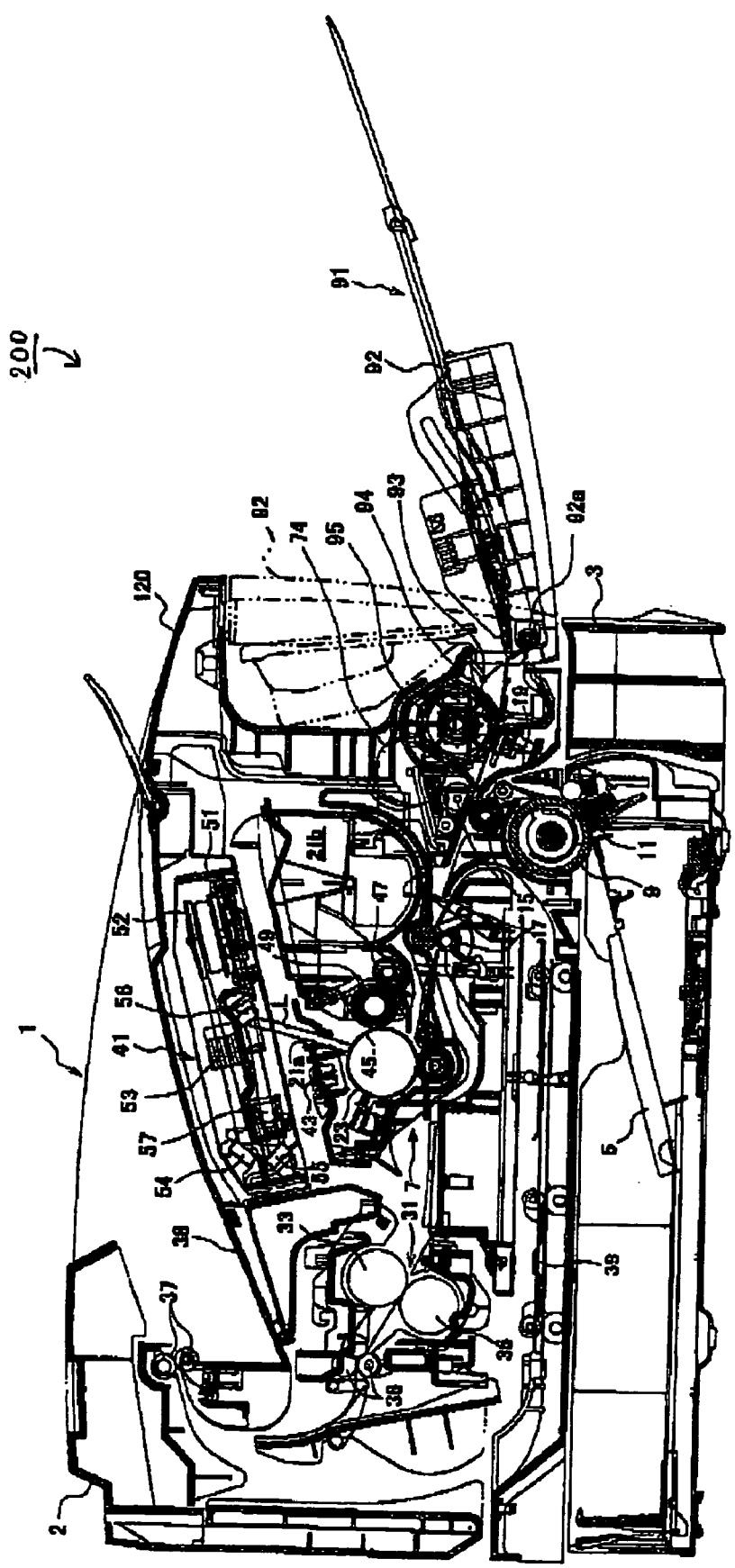
FIG. 7 is a sectional view of the laser printer in a state in which an auxiliary tray is attached to the main unit instead of the facsimile unit.

A paper-supply guide 19 is provided in the casing 2 at its front side. When the auxiliary tray 91 is attached to the front side of the casing 2 as shown in FIG. 7, recording papers P are supplied one at a time from the auxiliary tray 91 along the paper-supply guide 19 to the conveyance rollers 15 and registration rollers 17.

The image forming portion 7 includes: a photosensitive drum 23; and a transfer roller 25. The photosensitive drum 23 and the transfer roller 25 are mounted inside the process cartridge 21, and oppose with each other. As will be described later, a recording paper P formed with a toner image thereon passes through between the photosensitive drum 23 and the transfer roller 25, before being supplied to a fixing portion 31. The fixing portion 31 has a thermal roller 33 and a pressure roller 35. The toner image on the recording paper P is thermally fixed when the recording paper P passes through between the thermal roller 33 and the pressure roller 35. The recording paper P with the image being fixed by the fixing portion 31 is then conveyed by two pairs of discharge rollers 36, 37, and is discharged onto a discharge tray 38, which is provided on the upper surface 2U of the main unit 1.

The pair of discharge rollers 37 can rotate both in a forward direction and in a backward direction. When the pair of discharge rollers 37 rotate forward until a trailing end of the paper P reaches the pair of discharge rollers 37, then stop rotating, and then rotate backward, the pair of discharge rollers 37 can supply the recording paper P to a re-conveying path 39. This enables the image forming portion 7 to form images on both of the opposite surfaces of the recording paper P.

A scanner unit 41 is mounted at a location between the discharge tray 38 and the process cartridge 21. The scanner unit 41 is for scanning the photosensitive drum 23 with a laser light L.

Next, the configuration of the image forming portion 7 will be described.

The photosensitive drum 23 is rotatably mounted in the process cartridge 21. The photosensitive drum 23 has a photosensitive layer at its outer surface. A charger 43 is also mounted in the process cartridge 21. The charger 43 is for electrically charging the outer surface of the photosensitive drum 23 uniformly. The process cartridge 21 is formed with an exposure opening 21a, through which a laser light L from the scanner unit 41 enters the process cartridge 21. The laser light L then falls incident on the uniformly-charged surface of the photosensitive drum 23, thereby forming an electrostatic latent image on the surface of the photosensitive drum 23. Thereafter, a developer roller 45, which is mounted in the process cartridge 21, supplies toner onto the surface of the photosensitive drum 23, as a result of which the electrostatic latent image is developed into a visible toner image. The toner thus clinging to the photosensitive drum 23 is transferred onto the recording paper P when the recording paper P passes through between the photosensitive drum 23 and the transfer roller 25. Thus, the image is formed on the recording paper P.

The process cartridge 21 is further provided with a toner tank 21b, a supply roller 47, and a layer thickness regulating blade 49. The toner tank 21b stores toner therein. The supply roller 47 transfers toner from the toner tank 21b toward the developer roller 45. The layer thickness regulating blade 49 triboelectrically charges toner on the developer roller 45 and forms a toner layer on the developer roller 45.

The description now turns to the configuration of the scanner unit 41.

The scanner unit 41 has a casing 51. A laser source (not shown), a polygon mirror 52, an fθ lens 53, mirrors 54, 55, and 56, and a cylindrical lens 57 are mounted in the casing 51.

A laser beam L is generated by the laser source. The laser beam L is deflected by the polygon mirror 52 in a predetermined scan direction. The laser beam L deflected by the polygon mirror 52 passes through the fθ lens 53, and then is reflected by the mirrors 54, 55, and 56, before being emitted towards the photosensitive drum 23. The cylindrical lens 57 is disposed between the mirrors 55 and 56. A desired electrostatic latent image is formed on the photosensitive drum 23 by the generation of the laser beam L from the laser source at a suitable timing, and a visible toner image corresponding to the electrostatic latent image will be formed on the recording paper P.

When the facsimile unit 61 is rotated about the shafts 2a (FIG. 4) to open the aperture portion 2b as shown in FIG. 3, the process cartridge 21 can be detached from the casing 2 through the aperture portion 2b and a new process cartridge 21 can be attached in the casing 2 through the aperture portion 2b.

Figure 12:
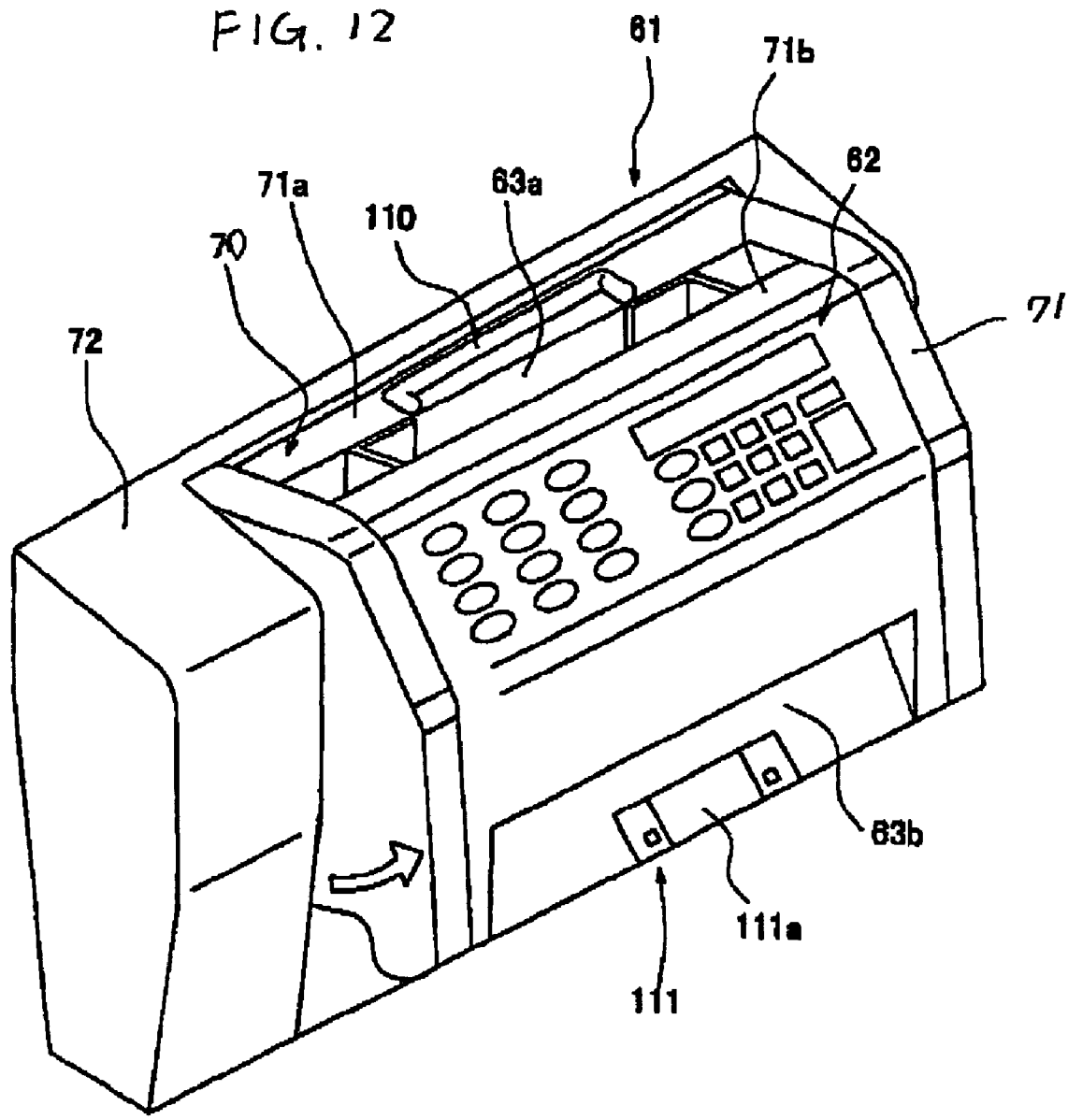
FIG. 12 is a perspective view of the facsimile unit, with a document mounting portion and a document receiving portion being in a stored state.

As shown in FIG. 1 and FIG. 12, the facsimile unit 61 has an image-reading portion 70 and a process cover 72.

Figure 9:
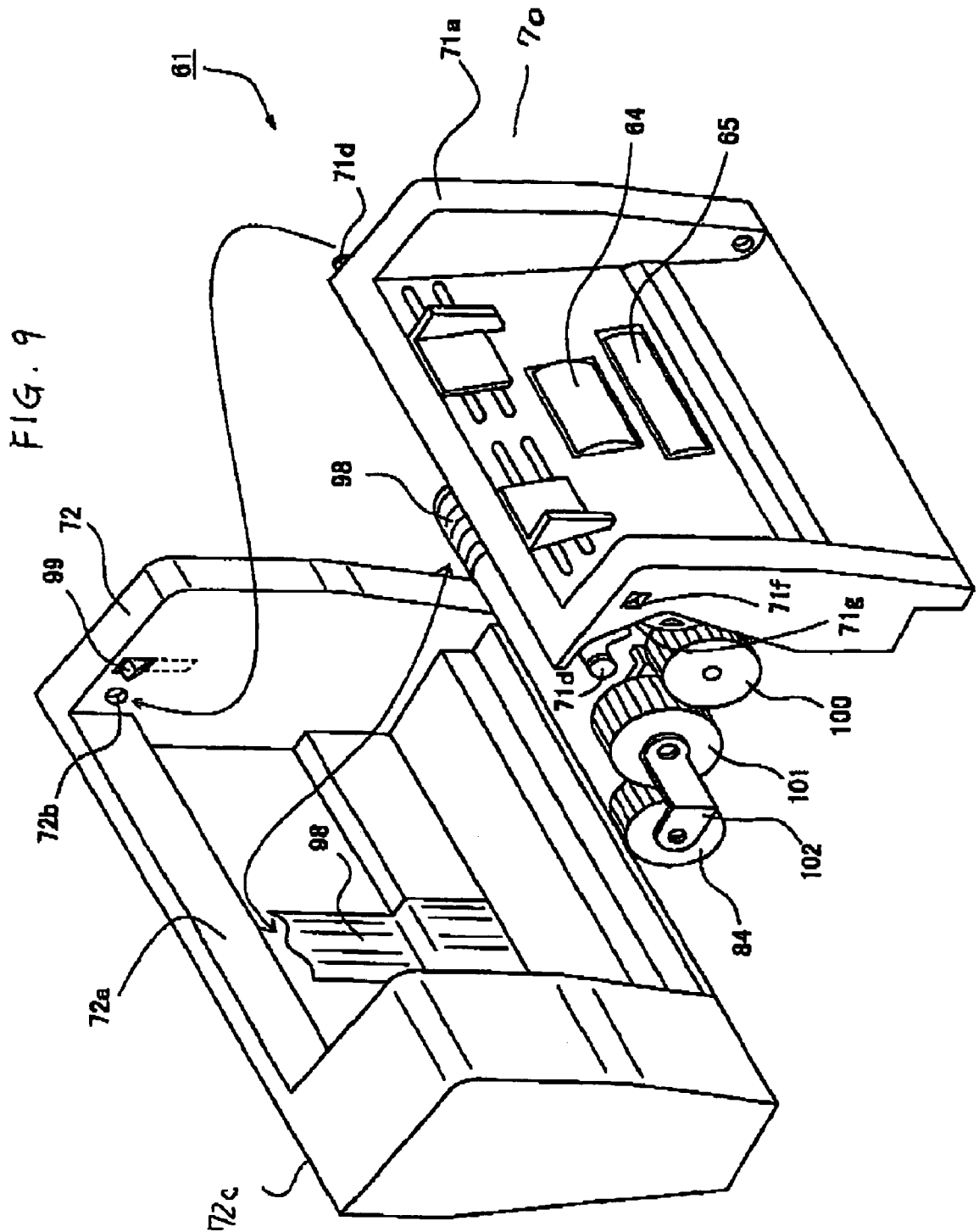
FIG. 9 is an exploded perspective view showing how to attach a base of a casing in the image-reading portion to the process cover.

As shown in FIG. 9, the process cover 72 has an indentation 72a on its front side. The indentation 72a is for receiving the image-reading portion 70 therein. The process cover 72 has a configuration shown in FIG. 5 on its rear side.

Figure 14:
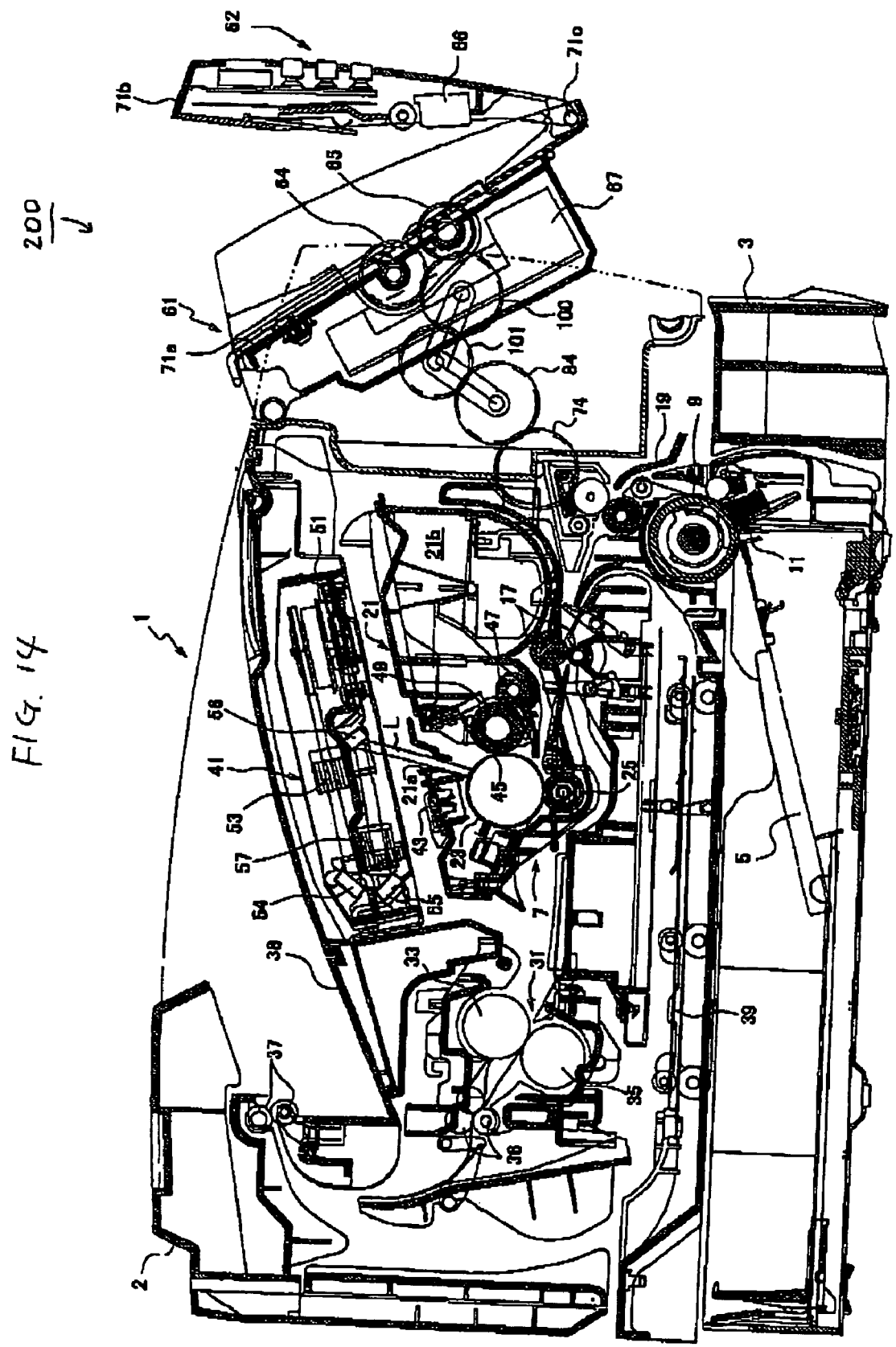
FIG. 14 is a sectional view of the laser printer when a lid portion of the image-reading portion is in an opened state.

As shown in FIG. 1 and FIG. 12, the image-reading portion 70 includes a casing 71. The casing 71 has a base portion 71a and a lid portion 71b. As shown in FIG. 1, the lid portion 71b is connected to the base portion 71a via a hinge 71c. The base portion 71a is shown in FIG. 9. The lid portion 71b can be switched between a closed position (FIG. 1) and an opened position (FIG. 14) with respect to the base portion 71a. When the lid portion 71b is in the opened position (FIG. 14) with respect to the base portion 71a, a user can perform maintenance operation to the inside of image-forming portion 70.

As shown in FIG. 12, an operating panel 62 is provided on a front surface of the lid portion 71b. As shown in FIG. 2, the operating panel 62 has numeric keys 62a and a liquid-crystal display 62b on the front surface thereof.

As shown in. FIG. 1 and FIG. 9, a pair of conveying rollers 64 and 65 and a communications processing portion 67 are supported in the base portion 71a. As shown in FIG. 9, a part of each conveying roller 64, 65 is exposed outside the base portion 71a. As shown in FIG. 1, a line sensor 66 is accommodated in the lid portion 71b. As shown in FIG. 1, a conveying path 63 is formed in a gap between the base portion 71a and the lid portion 71b and extends from a document insertion port 63a to a document discharge port 63b.

Within the image-reading portion 70 having the internal configuration described above, the conveying rollers 64 and 65 convey a document (not shown in the figures) along the conveying path 63. The line sensor 66 reads an image of the document while the document is being conveyed along the conveying path 63. The communications processing portion 67 provides communications over a telephone line.

As will be described with reference FIG. 9, a pair of shafts 71d protrude from the base portion 71a at its upper edge. The process cover 72 has a pair of holes 72b on its inner side walls that confront the indentation 72a. The base portion 71a is rotatably attached to the process cover 72, with the pair of shafts 71d being rotatably fitted in the holes 72b. Accordingly, the image-reading portion 70 as a whole can be switched between a storage position shown in FIG. 1, where the conveying path 63 extends substantially vertically downwardly along the front side surface 2F of the main unit 2, and a usage position shown in FIG. 8, where the conveying path 63 extends diagonally downward.

Figure 13:
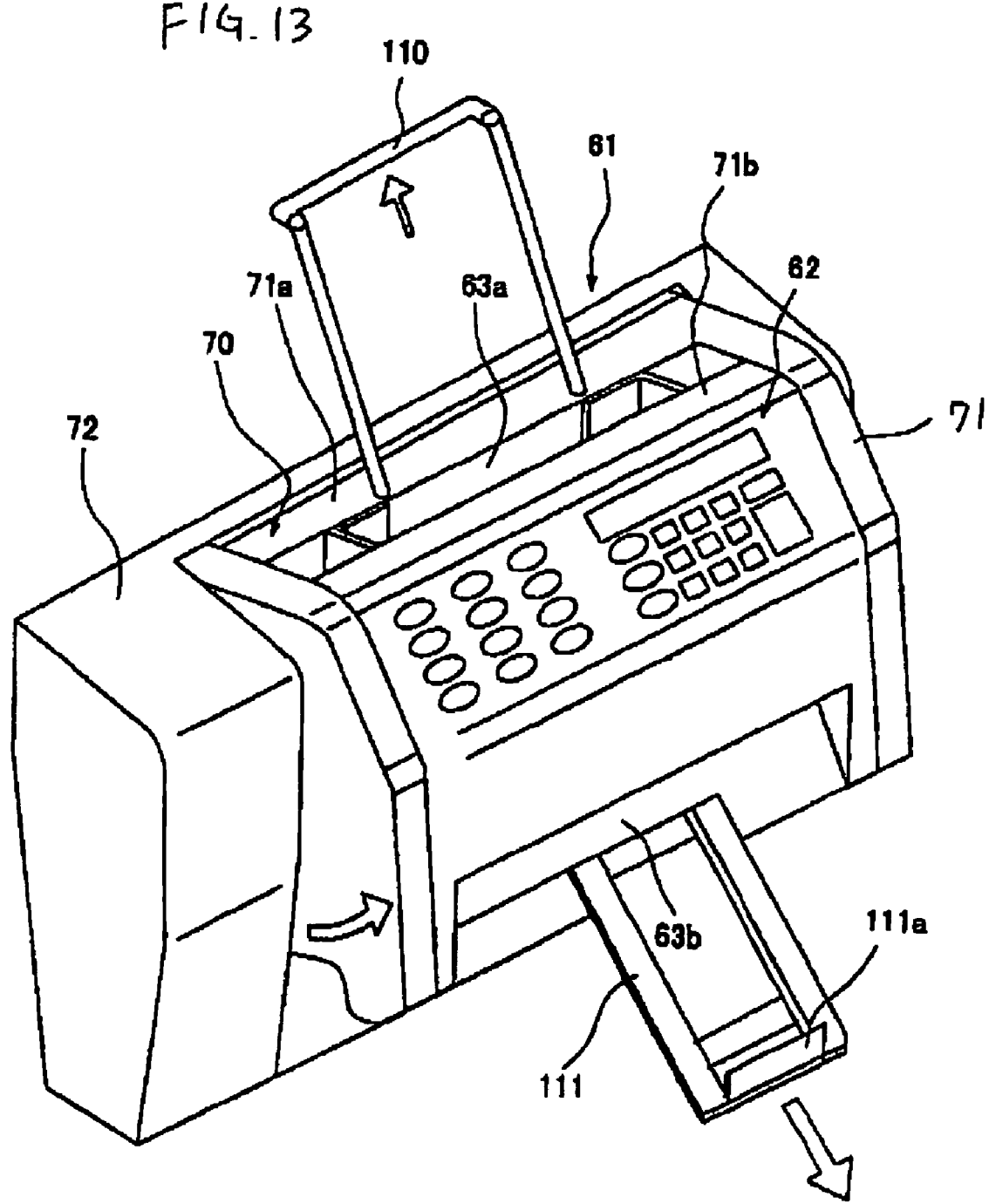
FIG. 13 is a perspective view of the facsimile unit, with the document mounting portion and the document receiving portion being in a projected state.

As shown in FIG. 12 and FIG. 13, the image-reading portion 70 is further provided with a document mounting portion 110 and a document receiving portion 111. The document mounting portion 110 is located in the vicinity of the document insertion port 63a, while the document receiving portion 111 is located in the vicinity of the document discharge port 63b. The document mounting portion 110 and the document receiving portion 111 are switched between a storage position (FIG. 12), where the document mounting portion 110 and the document receiving portion 111 are stored in the casing 71, and a projecting position (FIG. 13), where the document mounting portion 110 and the document receiving portion 111 are projected from the casing 71. The document receiving portion 111 has a leading edge 111a that can be turned up to extend perpendicularly to the discharge direction of the documents. When the document mounting portion 110 projects upward from the vicinity of the document insertion port 63a as shown in FIG. 13, documents mounted in the document insertion port 63a to be read by the image-reading portion 70 are prevented from drooping. When the document receiving portion 111 projects downward from the vicinity of the document discharge port 63b and the leading edge 111a is turned up to extend perpendicularly to the discharge direction of the documents, as shown in FIG. 13, documents discharged from the document discharge port 63b can be prevented from falling.

Next will be described how to install the facsimile unit 61 to the casing 2 with reference to FIG. 4 and FIG. 5.

In order to install the facsimile unit 61 to the casing 2, the process cover 72 in the facsimile unit 61 is attached to the casing 2. It is noted that in the front perspective view of the casing 2 in FIG. 4, the casing 2 is partially cutaway at its front left side portion to show components mounted in the inside of the casing 2. Also in the rear perspective view of the process cover 72 in FIG. 5, the process cover 72 is partially cutaway at its rear left side portion to show components mounted in the rear left side portion of the process cover 72.

As shown in FIG. 4, the pair of shaft portions 2a are provided on the left and right side walls 2L and 2R of the casing 2 at their locations above the paper cassette 3. The shaft portions 2a protrude outwardly from the left and right side walls 2L and 2R of the casing 2.

A female connector 73 is provided on the inner side of one shaft portion 2a that is located on the left side wall 2L. A connection gear 74 is mounted in the casing 2 and is partly exposed outside at a location directly above the female connector 73.

Although not shown in the drawings, a drive motor (not shown in the figures) is housed within the casing 2 of the main unit 1. A motor gear 75 is attached to the drive motor, and rotates integrally with the drive motor. A transfer gear 76 and an electromagnetic clutch gear 77 are also mounted in the casing 2. The driving force is transferred from the motor gear 75 to the connection gear 74 via the transfer gear 76 and the electromagnetic clutch gear 77.

Figure 5:
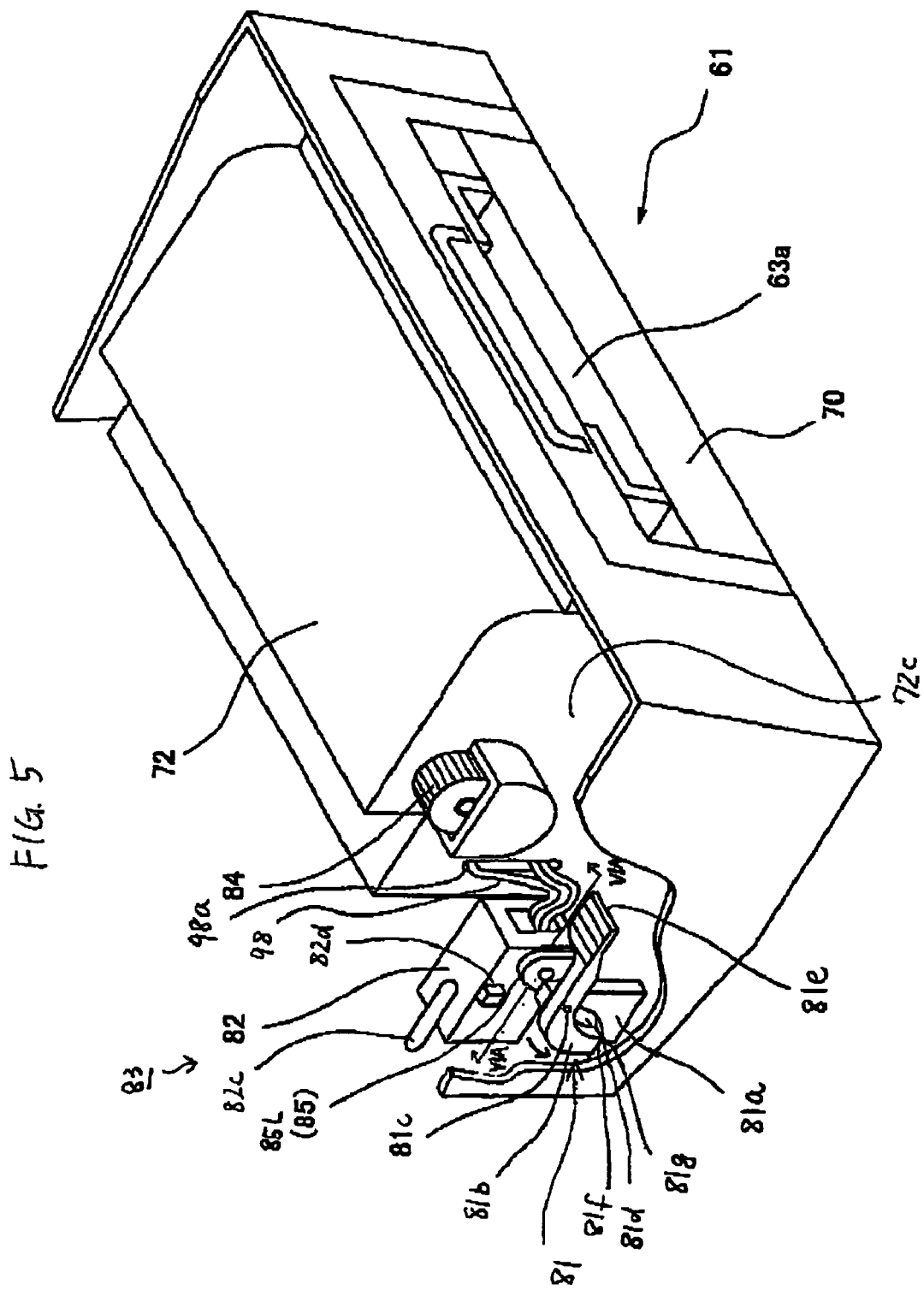
FIG. 5 is a perspective view of a rear side of a process cover.

The process cover 72 has a configuration shown in FIG. 5 at its rear side that confronts the front side of the casing 2 shown in FIG. 4.

A connection gear 84 is mounted on the rear side of the process cover 72 at a position that opposes the connection gear 74.

A pair of clothes-peg-shaped hinges 81, only one of which is shown in FIG. 5, are mounted on the rear side of the process cover 72 at its left and right side edges at positions that oppose the pair of shaft portions 2a on the casing 2 (FIG. 4).

Each hinge 81 has a fixed portion 81a and a movable portion 81b. The movable portion 81b is rotatably connected to the fixed portion 81a via a shaft 81c. The fixed portion 81a is fixedly secured to the process cover 72, and has a fixed tip end 81d at its one edge. The movable portion 81b has a lever 81e on its one edge and has a movable tip end 81f on its other edge. A gripping hole 81g is defined as being surrounded by the fixed portion 81a and the movable portion 81b. A spring (not shown) is provided on the hinge 81 to urge the movable portion 81b in a direction indicated by an arrow in FIG. 5 around the shaft 81c. Accordingly, the movable tip end 81f is normally in contact with the fixed tip end 81d.

In order to install the facsimile unit 61 (FIG. 5) to the casing 2 (shown in FIG. 4), the user operates the lever 81e to rotate the movable portion 81b against the urging force to separate the movable tip end 81f away from the fixed tip end 81d. Then, the shaft 2a is inserted into the gripping hole 81g of the hinge 81. As a result, the shaft 2a is rotatably supported in the gripping hole 81g, with the outer peripheral side surface of the shaft 2a confronting the inner peripheral side surface of the hinge 81 surrounding the gripping hole 81g. In this way, the process cover 72 of the facsimile unit 61 is pivotably supported at its lower edge to the casing 2.

When the user again operates the lever 81e of the hinge 81 against the urging force and separates the movable tip end 81f away from the fixed tip end 81d, the user can remove the shaft 2a from the hinge 81, thereby detach the facsimile unit 61 from the casing 2.

A male connector device 83 is mounted on the rear surface of the process cover 72 at a position that opposes the female connector 73. The male connector device 83 includes; a male connector 82; and a pair of supports 85 for supporting the male connector 82. The pair of supports 85 include a left-side support 85L and a right-side support 85R (FIG. 6(A)), which are located on the left and right sides of the male connector 82, respectively. Only the left-side support 85L is shown in FIG. 5. The male connector 82 is rotatably supported by the pair of supports 85L and 85R. The male connector 82 is supported by the pair of supports 85L and 85R at a position opposing the female connector 73. The left-side support 85L and the right-side support 85R have the same structures with each other.

Figure 6:
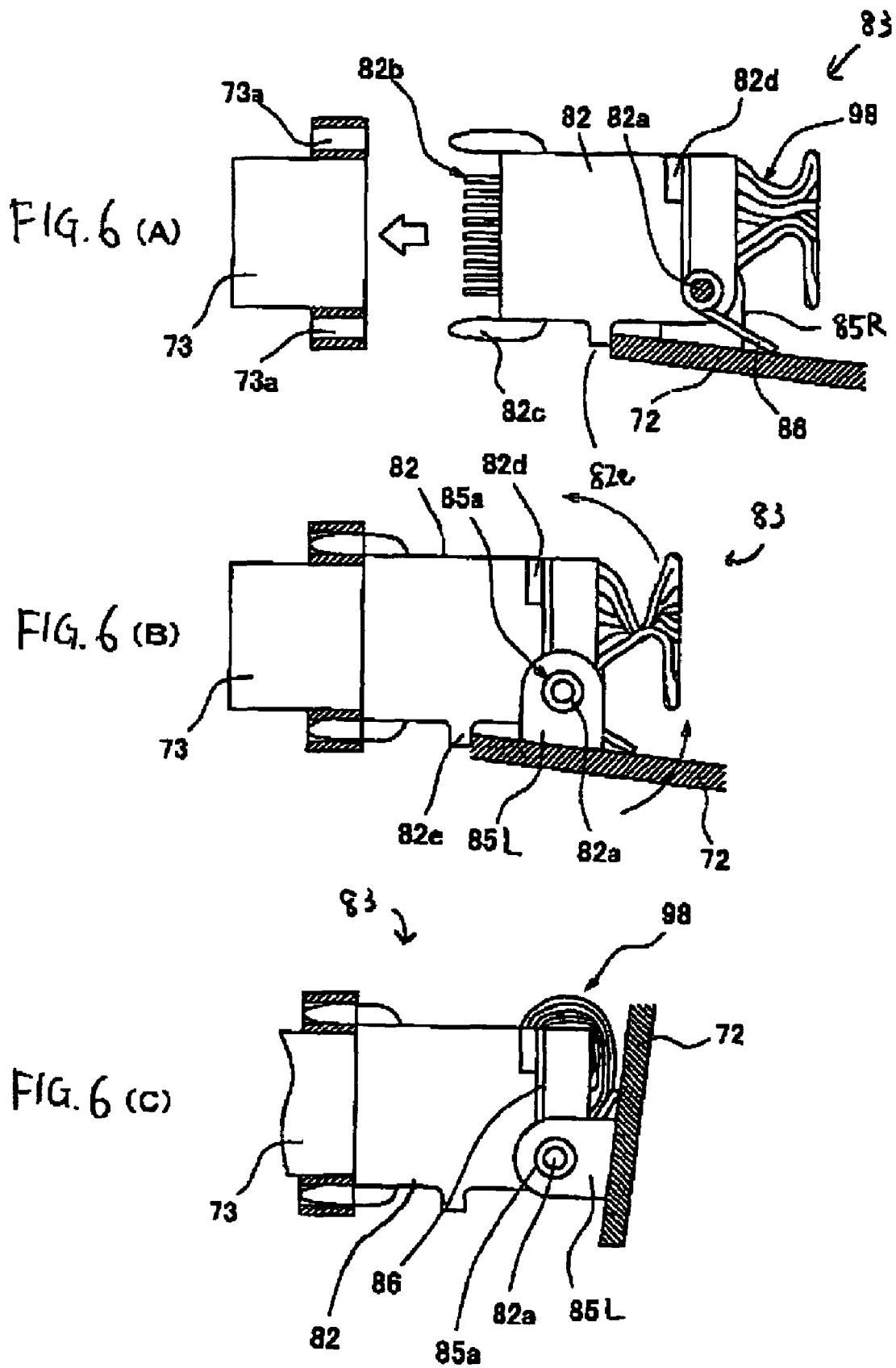
FIG. 6(A) is a sectional side view of a male connector device in FIG. 5 taken along a line VIA-VIA in FIG. 5 and illustrates how to connect a male connector to a female connector.
FIG. 6(B) is a left side view of the male connector device in FIG. 5 and. illustrates how the male connector is connected to the female connector.
FIG. 6(C) is a left side view of the male connector device in FIG. 5 and illustrates how the process cover is pivoted after the male connector is connected to the female connector.

More specifically, as shown in FIG. 6(A), a left-side shaft 82a protrudes leftwardly from the left side wall of the male connector 82, and a right-side shaft (not shown) protrudes rightwardly from the right side wall of the male connector 82. The left-side shaft 82a and the right-side shaft (not shown) have the same shape and size with each other, and extend with their central axes being aligned with the center of the gripping hole 81g of the hinge 81.

As shown in FIG. 6(B), the left-side support 85L is formed with a circular-shaped left-side through-hole 85a, and the right-side support 85R is formed with a circular-shaped right-side through-hole (not shown). The left-side through-hole 85a and the right-side through-hole (not shown) are located coaxially with each other. The male connector 82 is supported by the pair of supports 85L and 85R, with the left-side shaft 82a being received in the hole portion 85a of the left-side support 85L and the right-side shaft (not shown) being received in the hole portion (not shown) of the right-side support 85R. The left-side shaft 82a and the right-side shaft (not shown) have diameters smaller than the inner diameters of the hole portion 85a in the left-side support 85L and the hole portion (not shown) in the right-side support 85R. Accordingly, the left-side shaft 82a can freely move and rotate within the internal range of the hole portion 85a of the left-side support 85L, and the right-side shaft (not shown) can freely move and rotate within the internal range of the hole portion (not shown) of the right-side support 85R.

As shown in FIG. 5, a harness 98 extends from a front surface of the male connector 82. An aperture 98a is formed through the process cover 72. The harness 98 passes through the aperture 98a, thereby electrically connecting the male connector 82, which is located on the rear side of the process cover 72, to the communications processing portion 67, which is located on the front side of the process cover 72.

As shown in FIG. 6(A), a protrusion 82d protrudes leftwardly from a left side surface of the male connector 82. A protrusion 82e protrudes downwardly from a bottom surface of the male connector 82. A plurality of signal pins 82b protrude rearwardly from a rear surface of the male connector 82. A pair of guide pins 82c project rearwardly from upper and lower surfaces of the male connector 82. The guide pins 82c are longer than the signal pins 82b. A pair of guide holes 73a are formed in the female connector 73 at its upper and lower edges. The pair of guide pins 82c on the male connector 82 oppose the pair of guide holes 73a in the female connector 73.

A spring 86 is provided on the left-side shaft 82a that protrudes leftwardly from the left side wall of the male connector 82. One end of the spring 86 hooks over the protrusion 82d, and the other end of the spring 86 hooks onto the rear surface of the process cover 72. Because of the urging force of the spring 86, when the facsimile unit 61 is separate from the main unit 2, the male connector 82 is in a position shown in FIG. 5 and FIG. 6(A), where the protrusion 82e is in abutment contact with a lower edge of the process covers 72. Also because of the urging force of the spring 86, when the facsimile unit 61 is attached to the casing 2 as shown in FIG. 6(B), the spring 86 pushes the signal pins 82b in a direction toward the female connector 73.

When the facsimile unit 61 is separate from the main unit 2, the male connector 82 is oriented as shown in FIG. 5 with respect to the process cover 82.

In order to attach the facsimile unit 61 in the state of FIG. 5 to the casing 2, the operator first operates the hinges 81 to hold the shafts 2a therein, while inserting the guide pins 82c into the guide holes 73a. As a result, the facsimile unit 61 is smoothly brought from the state shown in FIG. 6(A) into the state shown in FIG. 6(B) according to the urging force of the spring 86. As a result, the female connector 73 is smoothly connected with the male connector 82.

Thereafter, as shown in FIG. 6(C), the operator rotates the process cover 72 around the left-side shaft 82a and the right-side shaft (not shown) of the male connector 82, whose central axes being in alignment with the rotational centers of the shafts 2a, which are now gripped by the hinges 81. As a result, the process cover 72 is brought into the position where the front surface of the process cover 72 extends substantially vertically. In this way, the facsimile unit 61 is completely installed in the main unit 1 as shown in FIG. 1. As a result, the connection gears 74 and 84 engage with each other, enabling the driving of the conveying rollers 64 and 65 as will be described later.

After the facsimile unit 61 is thus completely installed in the casing 2, image data read by the line sensor 66 or image data received by the communications processing portion 67 is sent to the main unit 1 through the male connector 82 and the female connector 73, and the corresponding image is formed on the recording paper P by the image-forming portion 7.

Because the process cover 72 can rotate around the shaft 2a, the entire facsimile unit 61 can be switched between the closed position of FIG. 1, where the facsimile unit 61 covers the opening 2b, and an opened position of FIG. 3, where the opening 2b is exposed outside. Because the male connector 82 is rotatably supported by the pair of supports 85, the male connector 82 maintains being connected with the female connector 73 even when the facsimile unit 61 is rotated between the closed position of FIG. 1 and the opened position of FIG. 3.

On the other hand, after the facsimile unit 61 is removed from the casing 2, as shown in FIG. 7, the auxiliary tray 91 can be attached to the casing 2 at a location, from which the facsimile unit 61 has been removed. Although not shown in the drawing, the auxiliary tray 91 has a pair of hinges that are similar to the hinges 81 on the process cover 72, and is operated to grip the shafts 2a on the casing 2.

The auxiliary tray 91 includes: a tray body 92; a pickup roller unit 94; and another process cover 120. The tray body 92 is for holding a stack of recording papers P thereon. The pickup roller unit 94 is provided with a pickup roller 93. The auxiliary tray 91 further includes a connection gear 95 that rotates integrally with the pickup roller 93.

Although not shown in the drawing, the hinges are mounted on the pickup roller unit 94. When the auxiliary tray 91 is installed to the casing 2 via the hinges, the connection gear 95 engages with the connection gear 74 on the casing 2 side (FIG. 4). When the pickup roller 93 is rotated clockwise in FIG. 7 through the engagement between the connection gears 74 and 95, the recording papers P that are held on the tray body 92 are separated one sheet at a time and conveyed along the paper-supply guide 19.

The tray body 92 can contract and extend in the front-and-rear direction. The tray body 92 has a shaft 92a. The tray body 92 is rotatable about the center of the shaft 92a with respect to the pickup roller unit 94. When the tray body 92 is contracted and is raised as shown by the broken lines in FIG. 7, the tray body 92 covers the front side of the main unit 1.

The process cover 120 is configured separately from the tray body 92 and the pickup roller unit 94. Assuming that the auxiliary tray 91 is in the state shown by solid lines in FIG. 7, when desiring to replace the process cartridge 21 with a new one, the user rotates the main tray unit 92 and the process cover 120, while keeping the pickup roller unit 94 to be remained fixed at the position of FIG. 7, to enable the replacement.

Figure 8:
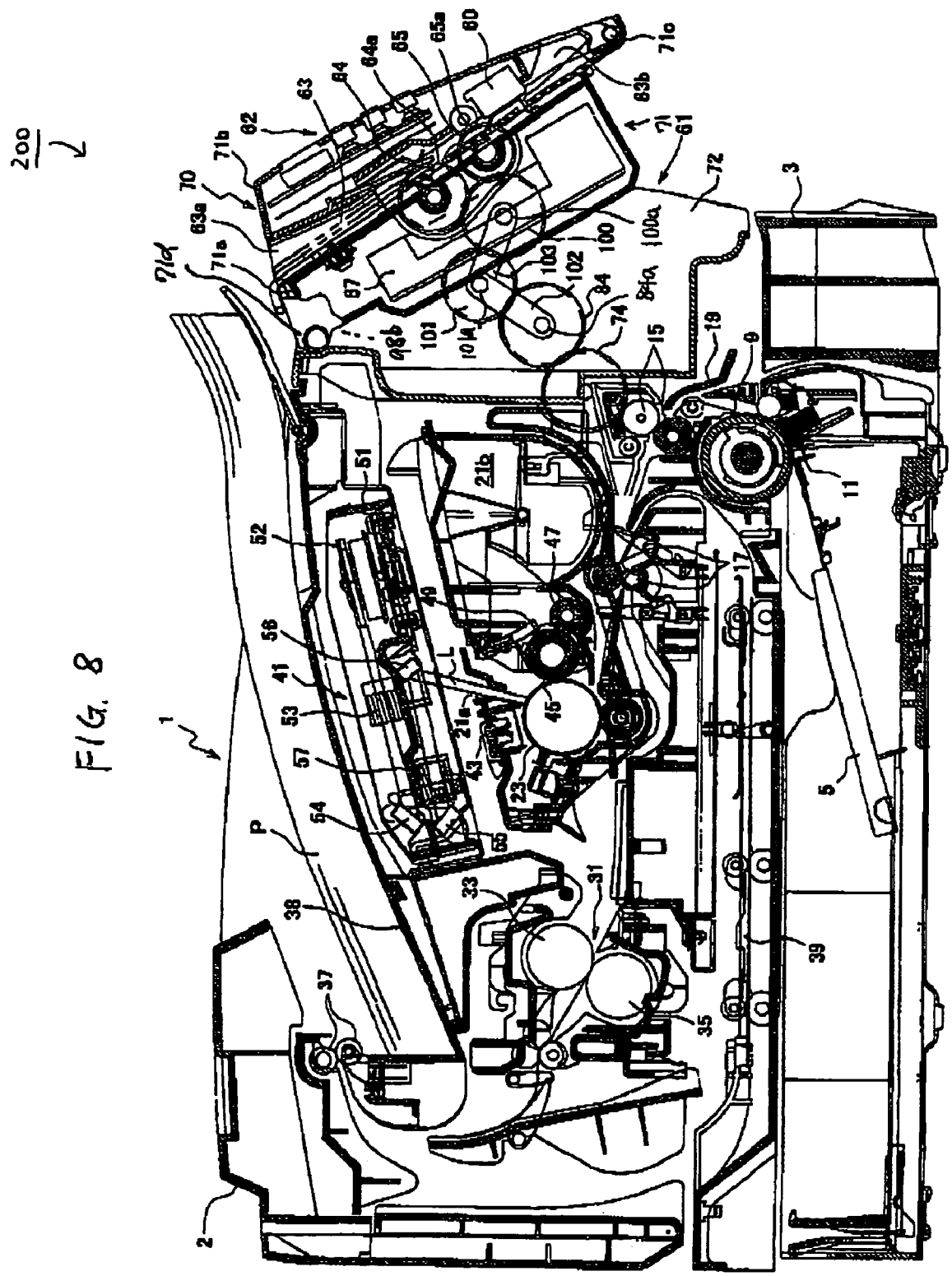
FIG. 8 is a sectional view of the laser printer in a state in which the image-reading portion is in a usage condition.

As shown in FIG. 8, the image-reading portion 70 can pivot with respect to the process cover 72 about the shafts 71d that are located at the upper edge of the image-reading portion 70.

This configuration will now be described in greater detail with reference to FIG. 9.

The indentation 72a is formed in the front surface of the process cover 72. The indentation 72a is for receiving the image-reading portion 70 therein. The pair of shafts 71d protrude outwardly from both of the left and right side surfaces of the base portion 71a of the image-reading portion 70. The pair of hole portions 72b, only one of which is shown in FIG. 9, are formed at the upper edges of the left and right side inner walls of the process cover 72 that face the indentation 72a. Each shaft 71d is rotatably fitted in the corresponding hole portion 72b.

As shown in FIG. 8, an aperture 98b is formed through the base portion 71a at an upper edge thereof. As described already, the harness 98 extends from the rear side of the process cover 72 and passes through the aperture 98a (FIG. 5) to enter the front side of the process cover 72, and then further extends upwardly and enters the inside of the base portion 71a through the aperture 98b. This ensures that the harness 98 will not obstruct the pivoting operation of the image-reading portion 70.

As shown in FIG. 8, a pair of stopper springs 99 are provided in the left and right side inner walls of the process cover 72 facing the indentation 72a. A pair of indentations 71f are formed on the left and right side walls of the base portion 71a. The image-reading portion 70 is held stably in the storage position in FIG. 1, where the conveying path 63 extends substantially vertically, when the stopper springs 99 engage with the indentations 71f. The image-reading portion 70 is held stably in the usage position in FIG. 8, where the conveying path 63 extends diagonally downwardly, when the stopper springs 99 engage with rear edges 71g of the left and tight side walls of the base portion 71a. It is noted that only one of the pair of stopper springs 99, one of the pair of indentations 71f, and one of the pair of rear edges 71g are shown in FIG. 9.

The description now turns to the drive mechanism for driving the conveying rollers 64 and 65. As shown in FIG. 8, the drive mechanism includes: a roller drive gear 100, an intermediate gear 101, and a pair of links 102 and 103. As described above with reference to FIG. 5, the connection gear 84 is supported on the process cover 72. The roller drive gear 100 is supported on the base portion 71a, and the intermediate gear 101 is disposed between the connection gear 84 and the roller drive gear 100. The link 102 connects a rotational shaft 84a of the connection gear 84 and a rotational shaft 101a of the intermediate gear 101 with each other to regulate the relative positions between the connection gear 84 and the intermediate gear 101, while keeping the connection gear 84 and the intermediate gear 101 in engagement with each other. Similarly, the link 103 connects the rotational shaft 101a of the intermediate gear 101 and a rotational shaft 100a of the roller drive gear 100 with each other to regulate the relative positions between the intermediate gear 101 and the roller drive gear 100, while keeping the intermediate gear 101 and the roller drive gear 100 in engagement with each other. Accordingly, the first and second links 102 and 103 allow the third gear 101 to move along the peripheral surfaces of the first gear 84 and the second gear 100. This configuration ensures that the driving force can always be transferred from the connection gear 84 to the intermediate gear 101 and then from the intermediate gear 101 to the roller drive gear 100, although the angle formed between the links 102 and 103 changes as the image-reading portion 70 pivots around the shafts 71d. Gears 64a and 65a are mounted in the base portion 71a to rotate integrally with the conveying rollers 64 and 65, respectively. The roller drive gear 100 are mounted in the base portion 71a as being always in engagement with both of the gears 64a and 65a. When the process cover 72 is attached to the main unit 1 and the connection gears 74 and 84 are engaged with each other and when the connection gear 74 starts rotating, the conveying rollers 64 and 65 will be driven regardless of the angle, by which the image-reading portion 70 is pivoted around the shafts 71d with respect to the process cover 72.

Figure 10:
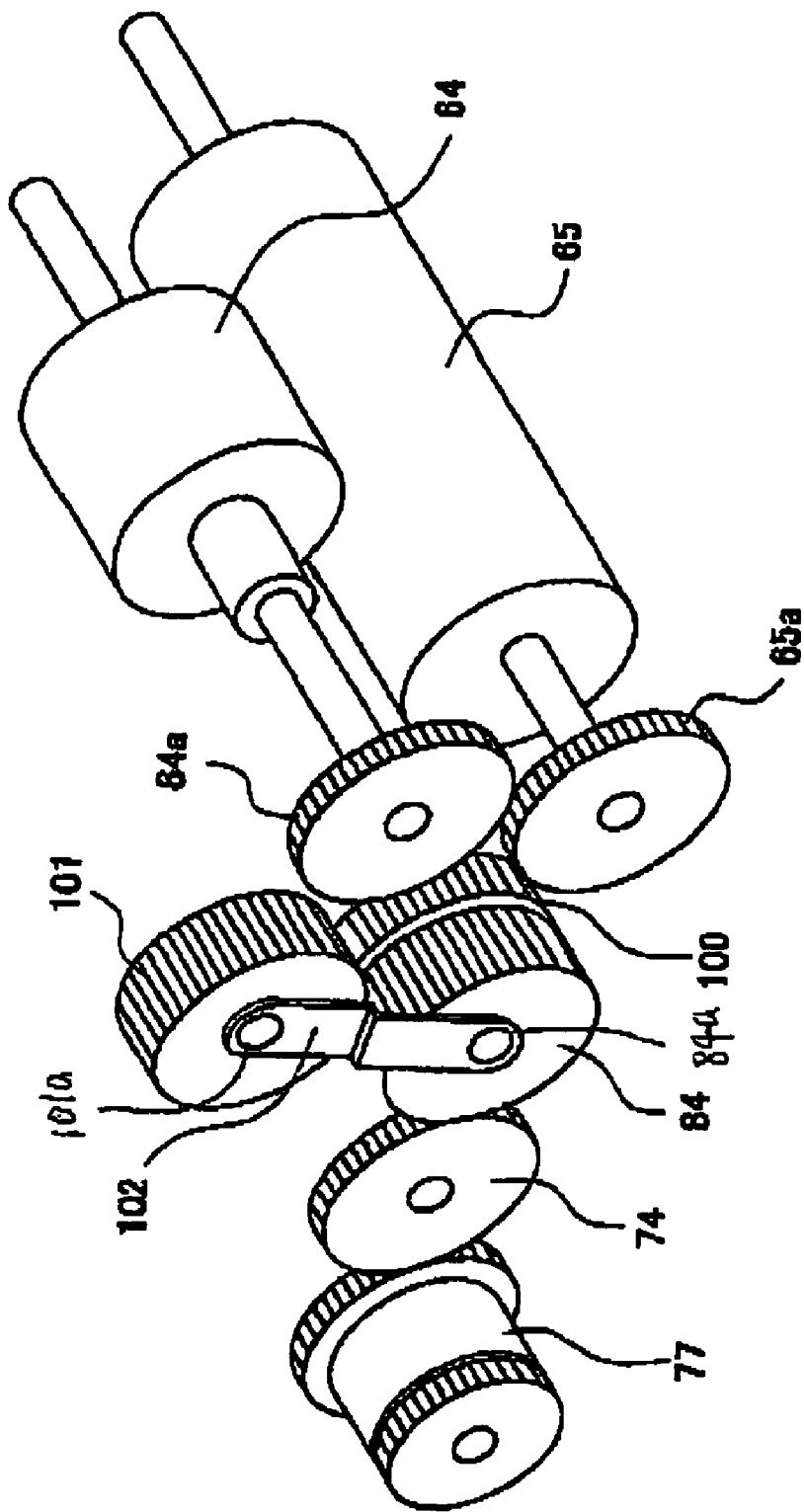
FIG. 10 is a perspective view showing a state of a conveying roller drive mechanism when the image-reading portion is in the storage state.
Figure 11:
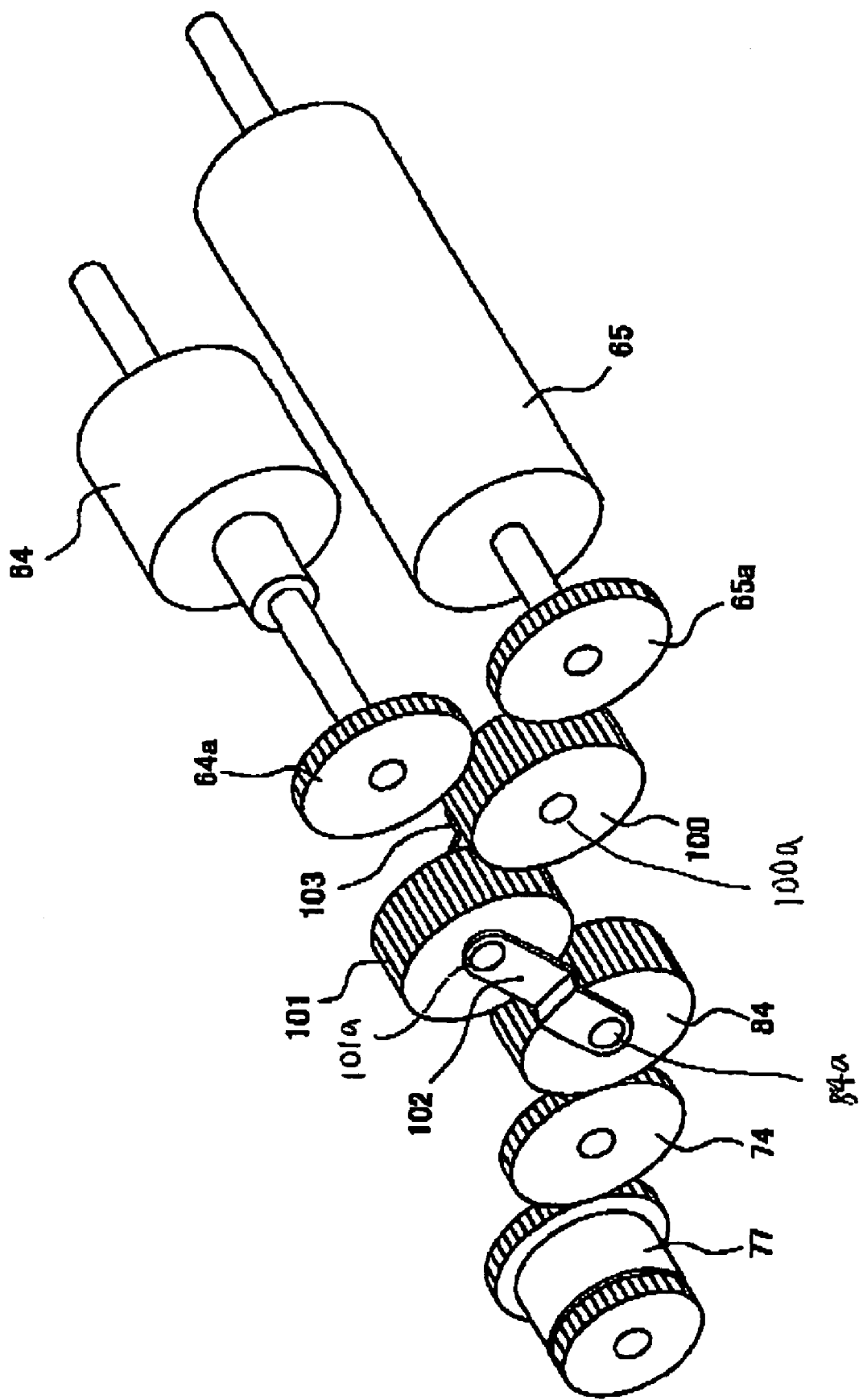
FIG. 11 is a perspective view showing the state of the conveying roller drive mechanism when the image-reading portion is in the usage state.

As shown in FIG. 10, the connection gear 84 and the roller drive gear 100 are located as being shifted from each other in their axial directions. This ensures that even when the gears 84 and 100 are located with their axes being aligned with each other as shown in FIG. 10, transfer of power from the connection gear 84 to the roller drive gear 100 via the intermediate gear 101 will be maintained without any interference between the gears 84 and 100. It is noted that FIG. 10 corresponds to the case in which the image-reading portion 70 is in the storage position shown in FIG. 1. In contrast, FIG. 11 corresponds to the case in which the image-reading portion 70 is in the usage position shown in FIG. 8. FIG. 10 and FIG. 11 show that power can be transferred from the gear 84 to the gears 64a and 65a regardless of whether the image-reading portion 70 is in any position between the position shown in FIG. 1 and the position shown in FIG. 8.

As described above, the image-reading portion 70 can pivot from the storage position shown in FIG. 1 at which the document conveying path 63 extends substantially in the vertical direction along the front side surface 2F of the main unit 1 to the usage position shown in FIG. 8 in which the conveying path 63 extends diagonally downward. Locating the image-reading portion 70 at the usage position of FIG. 8 improves the operability. Locating the image-reading portion 70 at the storage position makes the entire device 1 compact when the image-reading portion 70 is not being used. Because the process cover 72 is fixedly secured to the casing 2, the casing 71 of the image-reading portion 70 can be easily and stably pivoted with respect to the process cover 72 between the storage position and the usage position, Moreover, since the document mounting portion 110 and the document receiving portion 111 can project outward and can be stored in the image-reading portion 70, the entire device 1 can be made even more compact while improving the operability of the image-reading portion 70.

Since the facsimile unit 61, provided with the image-reading portion 70, can be replaced with the auxiliary tray 91, the installation space of the auxiliary tray 91 can be efficiently utilized, making the entire device 1 even more compact.

A driving force from the connection gear 74 can be used both to drive the pickup roller 93 in the auxiliary tray 91 and to drive the conveying rollers 64 and 65 in the image-reading portion 70. The number of components can be reduced and manufacturing costs can also be reduced, in comparison with a comparative configuration in which the pickup roller 93 and the conveying rollers 64 and 65 are driven separately from each other.

The paper cassette 3 is pulled out in the forward direction from the front side of the casing 2. The recorded paper is discharged onto the paper discharge tray 38 in the forward direction toward the front side of the casing 2. The image-reading portion 70 is located on the front side of the casing 2. The process cartridge 21 is detached from and attached to the inside of the casing 2 through the front side of the casing 2. Thus, the user sets the recording paper P, desired to be formed with images by the image forming portion 7, to the front side of the device 1, obtains the recorded paper P from the front side of the device 1, sets documents to be read by the image-reading portion 70 on the front side of the device 1, detaches the process cartridge 21 from the front side of the device 1, and attaches the process cartridge 21 to the front side of the device 1. In this way, the user's operations on the device 1 are all done from the front side of the device 1, which improves the operability even further.

Figure 15A:
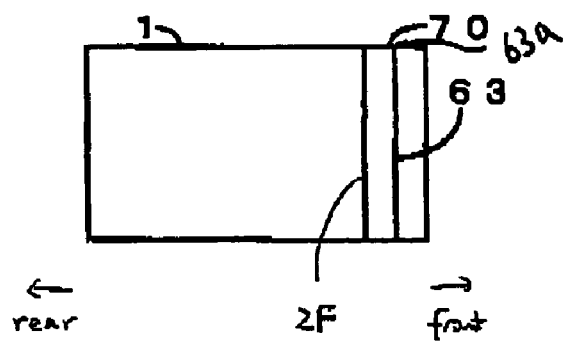
FIG. 15(A) is an illustration showing a state how the image-reading portion is in the storage state.
Figure 15B:
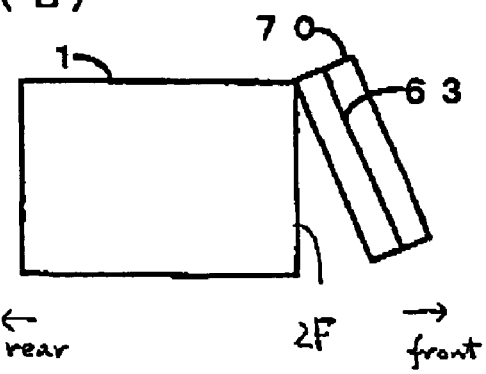
FIG. 15(B) is an illustration showing a state how the image-reading portion is in the usage state.

FIG. 15(A) and FIG. 15(B) schematically show the configuration of the present embodiment, in which the image-reading portion 70 is provided on the front side surface 2F of the main unit 1. The image-reading portion 70 switches between: the storage state, where both the upper and lower edges of the image-reading portion 70 are located adjacent to the front side surface 2F and therefore the conveying path 63 extends substantially vertically along the front side surface 2F as shown in FIG. 15(A); and the usage state, where the upper edge of the image-reading portion 70 is located adjacent to the front side surface 2F but the lower end of the image-reading portion 70 is separate away from the front side surface 2F and therefore the conveying path 63 extends diagonally downward as shown in FIG. 15(B).

When the image-reading portion 70 is being used, if the conveying path 63 were extended vertically as shown in FIG. 15(A) and if a plurality of documents are set in the document insertion port 63a, all those sheets would be supplied under their own weight, making it difficult for the image-reading portion 70 to convey them one at a time in sequence and thus reducing the performance of the image-reading operation. According to the present embodiment, however, when the image-reading portion 70 is being used, the conveying path 63 extends diagonally downward as shown in FIG. 15(B). Even if a plurality of documents are set in the document insertion port 63a, all those sheets can be properly supplied one at a time in sequence for the image-reading operation.

On the other hand, when the image-reading portion 70 is not being used, if the conveying path 63 were extended diagonally downward as shown in FIG. 15(B), the entire image-forming device cannot be made sufficiently compact. According to the present embodiment, however, when the image-reading portion 70 is not being used, the conveying path 63 extends substantially vertically along the front side surface 2F of the main unit 1 as shown in FIG. 15(A), the entire image-forming device can be made sufficiently compact.

<Modification>

Figure 15C:
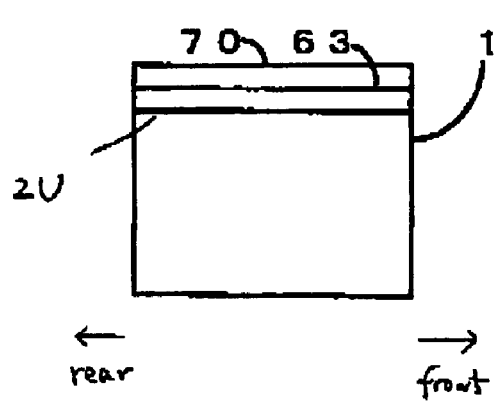
FIG. 15(C) is an illustration showing a state how the image-reading portion is in a storage state according to a modification.
Figure 15D:
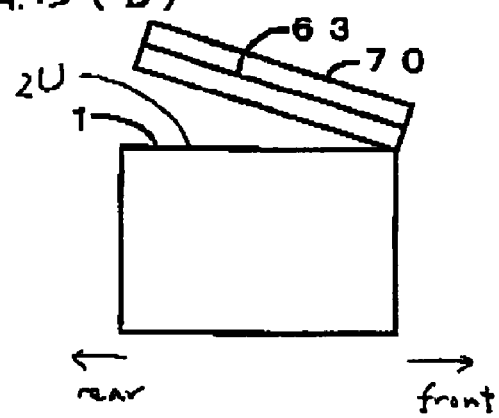
FIG. 15(D) is an illustration showing a state how the image-reading portion is in a usage state according to the modification.

According to a modification, the image-reading portion 70 is provided on or above the upper surface 2U of the casing 2 in the main unit 1 as shown in FIG. 15(C) and FIG. 15(D). For example, the image-reading portion 70 may be provided above the discharge tray 38. Also in this case, the image-reading portion 70 switches between: a storage state wherein both the front and rear ends of the image-reading portion 70 are located adjacent to the upper surface 2U and therefore the conveying path 63 extends substantially horizontally along the upper surface 2U as shown in FIG. 15(C); and a usage state in which the front end of the image-reading portion 70 is located adjacent to the upper surface 2U but the rear end of the image-reading portion 70 is separate away from the upper surface 2U and therefore the conveying path 63 extends diagonally downward as shown in FIG. 15(D).

This modification attains effects similar to those of the above-described embodiment. More specifically, when the image-reading portion 70 is being used, if the conveying path 63 were extended horizontally as shown in FIG. 15(C), it becomes impossible to supply the paper by the weight of the documents, and an additional mechanism such as a pickup roller would be required to be provided to the image-reading unit, thus increasing the manufacturing cost of the entire device. According to the present modification, however, when the image-reading portion 70 is being used, the conveying path 63 extends diagonally downward as shown in FIG. 15(D), it is possible to supply the paper by their own weight. It is unnecessary to provide any additional mechanism, thus not increasing the manufacturing cost of the entire device.

On the other hand, when the image-reading portion 70 is not being used, if the conveying path 63 were extended diagonally downward as shown in FIG. 15(D), the entire image-forming device cannot be made sufficiently compact. According to the present modification, however, when the image-reading portion 70 is not being used, the conveying path 63 extends substantially horizontally along the upper surface of the device as shown in FIG. 15(C), the entire image-forming device can be made sufficiently compact.

While the invention has been described in detail with reference to the specific embodiment thereof, it would be apparent to those skilled in the art that various changes and modifications may be made therein without departing from the spirit of the invention.

For example, the image-reading portion 70 can be provided with another drive source separate from the drive source in the main unit 1.

What is claimed is:

1. An image-forming device comprising:
    an image-reading unit having a conveying path, the image-reading unit further having an image-reading portion that reads an image of a document while the document is being conveyed along the conveying path, the image-reading portion having an image-reading casing and an image-reading device mounted in the image-reading casing, the image-reading casing having the conveying path, the image-reading unit further having a support frame that supports the image-reading casing, an upper edge of the image-reading casing being pivotably attached to an upper edge of the support frame; and
    a main unit having a main casing and an image-forming unit, the image-forming unit forming an image on a recording medium and being accommodated in the main casing, the main casing having:
        a surface that extends substantially in either one of a horizontal direction and a vertical direction;
        an aperture portion at the surface; and
        a shaft portion at the surface,
    the image-reading portion being switched with respect to the main unit by pivoting between a first state in which the conveying path extends along the surface and a second state in which the conveying path extends diagonally downward, the support frame being pivotable about the shaft portion at a lower edge of the support frame between an open state in which the support frame opens the aperture portion and a closed state in which the support frame closes the aperture portion, and the image-forming unit being removable from the main casing through the aperture portion when the support frame is in the open state.

2. The image-forming device as claimed in claim 1, wherein:

the image-reading casing is switched between the first state, in which a lower edge of the image-reading casing is located adjacent to the lower edge of the support frame, and the second state, in which the lower edge of the image-reading casing is separate away from the lower edge of the support frame.

3. The image-forming device as claimed in claim 2, wherein the main casing receives the image-reading unit detachably at the surface, further comprising an auxiliary tray, the main casing receiving the auxiliary tray at the surface when the image-reading unit is separate from the surface, the auxiliary tray receiving thereon a recording medium on which an image is to be formed by the image-forming unit.

4. The image-forming device as claimed in claim 3, wherein:

the aperture portion receives the image-reading unit therein; and the support frame has a gripping portion that selectively grips the shaft portion to thereby allow the image-reading unit to be detachably attached to the main unit.

5. The image-forming device as claimed in claim 3, wherein:

the image-reading unit has an image-reading conveying portion that conveys the recording medium that is to be read by the image-reading device and a drive portion that drives the conveying portion;

the auxiliary tray has an image-recording conveying portion that conveys the recording medium that is received on the auxiliary tray towards the image-forming unit in the main unit; and the main unit further has a driving force transfer portion that transfers a driving force to the image-forming conveying portion when the auxiliary tray is attached to the main unit and transfers a driving force to the drive portion in the image-reading unit when the image-reading unit is attached to the main unit.

6. The image-forming device as claimed in claim 5, wherein:

the driving force transfer portion includes a driving force transfer gear that rotates upon receipt of a driving force from a drive motor;

the image-reading conveying portion includes a document conveying roller that conveys the document to be read by the image-reading device;

the drive portion includes:

a document conveying gear that rotates together with the document conveying roller; and a gear mechanism that transfers the driving force from the driving force transfer gear to the document conveying gear;

the gear mechanism includes:

a first gear that is supported by the support frame and that engages with the driving force transfer gear when the image-reading unit is attached to the main casing;

a second gear that is supported by the image-reading casing and that engages with the document conveying gear; and a third gear that engages with both of the first gear and the second gear;

a first link that connects a rotational shaft of the first gear to a rotational shaft of the third gear; and a second link that connects the rotational shaft of the second gear to the rotational shaft of the third gear, the first and second links allowing the third gear to move along peripheral surfaces of the first gear and the second gear, while keeping engagement with both of the first gear and the second gear, an angle formed between the first link and the second link varying as the image-reading casing switches between the first state and the second state relative to the support frame.

7. The image-forming device as claimed in claim 1, wherein:

the image-reading portion has at least one of a document mounting portion that holds a document to be read by the image-reading device and a document receiving portion that holds a document having read by the image-reading device; and each of the document mounting portion and the document receiving portion is switched between a first position, at which each of the document mounting portion and the document receiving portion projects out of the image-reading casing to extend in a direction along the conveying path, and a second position, at which each of the document mounting portion and the document receiving portion is accommodated within the image-reading casing.

8. The image-forming device as claimed in claim 1, wherein the main casing includes a side wall that extends substantially in a vertical direction, the side wall having the surface.

9. The image-forming device as claimed in claim 8, wherein the main casing further has another side wall that extends substantially in the vertical direction and that is opposite to the side wall, further comprising:

a cassette that stores therein a recording medium on which an image is to be formed by the image-forming unit, the cassette being pulled out from the main casing at a lower portion in the side wall; and a discharge tray provided on an upper surface of the main casing, into which the recording medium is discharged after an image has been formed thereon by the image-forming unit, the recording medium being discharged onto the discharge tray in a direction from the other side wall to the side wall.

10. The image-forming device as claimed in claim 1, wherein the main casing includes a upper wall that extends substantially in a horizontal direction, the upper wall having the surface.

* * * * *